US012030150B2

(12) United States Patent
Atkins et al.

(10) Patent No.: US 12,030,150 B2
(45) Date of Patent: Jul. 9, 2024

(54) DRILL BIT CUTTER EVALUATION METHODS AND SYSTEMS

(71) Applicant: Halliburton Energy Services, Inc., Houston, TX (US)

(72) Inventors: William Brian Atkins, Houston, TX (US); Jose Nestor Quiroz, Jersey Village, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 396 days.

(21) Appl. No.: 17/594,161

(22) PCT Filed: Jun. 10, 2019

(86) PCT No.: PCT/US2019/036353
§ 371 (c)(1),
(2) Date: Oct. 5, 2021

(87) PCT Pub. No.: WO2020/251535
PCT Pub. Date: Dec. 17, 2020

(65) Prior Publication Data
US 2022/0168862 A1    Jun. 2, 2022

(51) Int. Cl.
*G06N 20/00* (2019.01)
*B23Q 17/09* (2006.01)
*B23Q 17/24* (2006.01)

(52) U.S. Cl.
CPC ....... *B23Q 17/0995* (2013.01); *B23Q 17/249* (2013.01); *G06N 20/00* (2019.01)

(58) Field of Classification Search
None
See application file for complete search history.

(56) References Cited

U.S. PATENT DOCUMENTS

| 4,928,521 A | 5/1990 | Jardine |
| 5,021,675 A | 6/1991 | Fischer |

(Continued)

FOREIGN PATENT DOCUMENTS

| CN | 106023137 | 10/2016 |
| WO | 2009079371 A1 | 6/2009 |
| WO | 2018033549 A1 | 2/2018 |

OTHER PUBLICATIONS

PCT Application Serial No. PCT/US2019/036343, International Search Report, mailed Mar. 6, 2020, 3 pages.

(Continued)

*Primary Examiner* — Tahmina N Ansari
(74) *Attorney, Agent, or Firm* — DeLizio, Peacock, Lewin & Guerra, LLP

(57) ABSTRACT

A method includes acquiring an image of a cutter on a drill bit, determining a cutter dull condition based on the image of the cutter using a machine-learning method, wherein the machine-learning method is trained using a set of training images and a set of known cutter dull conditions, wherein each of the set of known cutter dull conditions is associated with one or more of a set of cutters depicted in the set of training images and determining a cutter degradation severity based the image of the cutter. The method also includes generating bit modification instructions based the cutter dull condition and the cutter degradation severity.

19 Claims, 7 Drawing Sheets

(56) References Cited

U.S. PATENT DOCUMENTS

| | | | |
|---|---|---|---|
| 5,730,234 | A | 3/1998 | Putot |
| 5,871,391 | A | 2/1999 | Pryor |
| 7,372,977 | B2 | 5/2008 | Fujimura et al. |
| 8,374,835 | B2 | 2/2013 | Lind et al. |
| 8,738,342 | B2 | 5/2014 | Lind et al. |
| 8,760,668 | B1 | 6/2014 | Wiggins et al. |
| 9,792,530 | B1 | 10/2017 | Wu et al. |
| 11,578,583 | B2 * | 2/2023 | Samuel ................ E21B 47/002 |
| 2002/0138240 | A1 | 9/2002 | Jelley et al. |
| 2005/0096847 | A1 | 5/2005 | Huang et al. |
| 2008/0040084 | A1 | 2/2008 | Huang |
| 2008/0262810 | A1 | 10/2008 | Moran et al. |
| 2012/0290206 | A1 | 11/2012 | Hartmann et al. |
| 2015/0287150 | A1 | 10/2015 | Meerdo et al. |
| 2015/0314411 | A1 | 11/2015 | Samukawa et al. |
| 2017/0032061 | A1 | 2/2017 | Izbinski et al. |
| 2018/0181105 | A1 * | 6/2018 | Shindou ............. B23Q 17/0995 |
| 2018/0246494 | A1 * | 8/2018 | Nakahama ......... B23Q 17/0952 |
| 2019/0145183 | A1 * | 5/2019 | Potash .................... E21B 10/00 700/175 |
| 2021/0174486 | A1 | 6/2021 | Chowhan |
| 2022/0168862 | A1 * | 6/2022 | Atkins .................... G06N 20/00 |
| 2022/0282609 | A1 * | 9/2022 | Samuel ................ E21B 47/002 |

OTHER PUBLICATIONS

PCT Application Serial No. PCT/US2019/036343, International Written Opinion, mailed Mar. 6, 2020, 8 pages.

PCT Application Serial No. PCT/US2019/036353, International Search Report, mailed Mar. 9, 2020, 6 pages.

PCT Application Serial No. PCT/US2019/036353, International Written Opinion, mailed Mar. 9, 2020, 6 pages.

PCT Application Serial No. PCT/US2019/036362, International Search Report, mailed Mar. 5, 2009, 4 pages.

PCT Application Serial No. PCT/US2019/036362, International Written Opinion, mailed Mar. 5, 2009, 5 pages.

"U.S. Appl. No. 17/594,147, Non-Final Office Action", filed Mar. 21, 2024, 18 pages.

"U.S. Appl. No. 17/594,147, Restriction Requirement", filed Jan. 10, 2024, 7 pages.

* cited by examiner

DRILL BIT CUTTER EVALUATION METHODS AND SYSTEMS

BACKGROUND

The disclosure generally relates to the field of drill bit design, and more particularly to bit cutter designs.

Boreholes may be drilled into the Earth using a drill bit having a plurality of cutters disposed on a bit body. The cutters may include super-hard, wear-resistant materials such as a polycrystalline diamond compact (PDC) secured to a tungsten carbide substrate. During drilling, physical contact between the cutters and the material being drilled will eventually wear or otherwise degrade the cutters, despite the use of these materials.

BRIEF DESCRIPTION OF THE DRAWINGS

Embodiments of the disclosure may be better understood by referencing the accompanying drawings.

DETAILED DESCRIPTION

The description that follows includes example systems, methods, techniques, and program flows that embody embodiments of the disclosure. However, it is understood that this disclosure can be practiced without these specific details. For instance, this disclosure refers to round cutters. Aspects of this disclosure can instead be applied to other cutter shapes such as triangular cutters, rectangular cutters, conical cutters, etc. In other cases, well-known instruction instances, protocols, structures and techniques have not been shown in detail in order not to obfuscate the description.

Various embodiments may relate to a cutter evaluation method and related systems for evaluating and generating bit modification instructions based on one or more images of one or more cutters on a drill bit, wherein each cutter can be represented by one or more images. For example, a system can operate to analyze an image of a cutter to determine a cutter dull condition and/or a cutter degradation severity using machine-learning methods implemented by one or more neural networks included as a part of a machine-learning framework. The machine-learning framework can be trained using training data, wherein the training data includes training images and a set of known cutter dull conditions and/or a set of known cutter degradation severity values associated with cutters depicted in training images. Based on the cutter dull condition and/or the cutter degradation severity, the system can provide instructions for a repair operation such as rotating a cutter to expose a less-used portion of the cutter. Alternatively, the machine-learning framework can provide instructions for a refurbishment operation such as replacing a cutter on the drill bit with a new cutter.

By providing cutter repair/replacement instructions based on both the cutter dull condition and the cutter degradation severity, the system can operate to increase drill bit efficiency during a drilling operation using the repaired/replaced cutter. In addition, the consistency of the operations described below provides a more uniform method of replacing cutters on a drill bit. Furthermore, by providing a cutter evaluation method supported by machine-learning, the system can operate to increase cutter planning efficiency by providing information useful for selecting appropriate grades of cutters among the various cutter positions in a drill bit.

Example Drill Bit and Drill Bit Image Acquisition System

Figure 1:
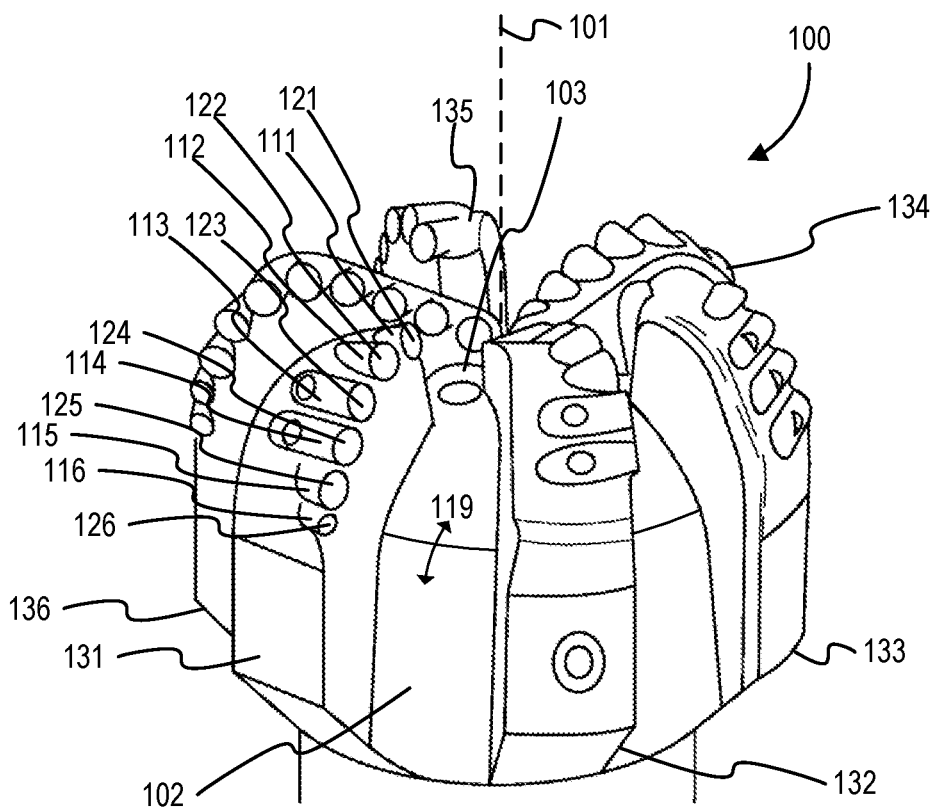
FIG. 1 is an isometric view of a drill bit.

FIG. 1 is an isometric view of a drill bit. In FIG. 1, the drill bit 100 is adapted for drilling through formations of rock to generate a borehole. Drill bit 100 includes a bit axis 101, a bit body 102, a bit face 103 on the end of the drill bit 100 and drill blades 131-136. The drill blades 131-136 can be angularly spaced-apart, extending from the bit body 102, and be integrally formed as part of the bit body 102. The drill blades 131-136 extend radially across the bit face 103 and longitudinally along a portion of the periphery of the drill bit 100. It should be understood that as used herein, the term "radial" or "radially" refers to positions or movement substantially perpendicular to the direction of bit axis 101. In addition, it should be understood that as used herein, the term "axial," "axially", or "longitudinally" refers to positions or movement generally parallel to the direction of bit axis 101.

Bit cutters are mounted on the drill blades 131-136. The drill blades 131-136 are separated by grooves which define drilling fluid flow paths 119 between and along the cutting faces of the cutters. Forces applied onto a material from the surfaces of cutters can be used to drill away material. For example, the cutters 111-116 distributed along the bottom and side of the drill blade 131 can apply force on a material via their respective cutter surfaces 121-126. While the cutters 111-116 are shown as round cutters, the cutters on the drill bit 100 can have many other shapes.

In some embodiments, a system can store a three-dimensional (3D) model of the drill bit 100 that includes identifier values for cutters in the 3D model. For example, each of the cutters 111-116 can be associated with an identifier value in the 3D model. Example identifier values can include a string such as "bit1-blade3-cutter003x-type3" or a numeric value such as "0398621." As described further below, the system can associate a set of candidate cutters at one or more positions on the drill bit by assigning the set of candidate cutters to the identifier value of a cutter in the 3D model.

Figure 2:
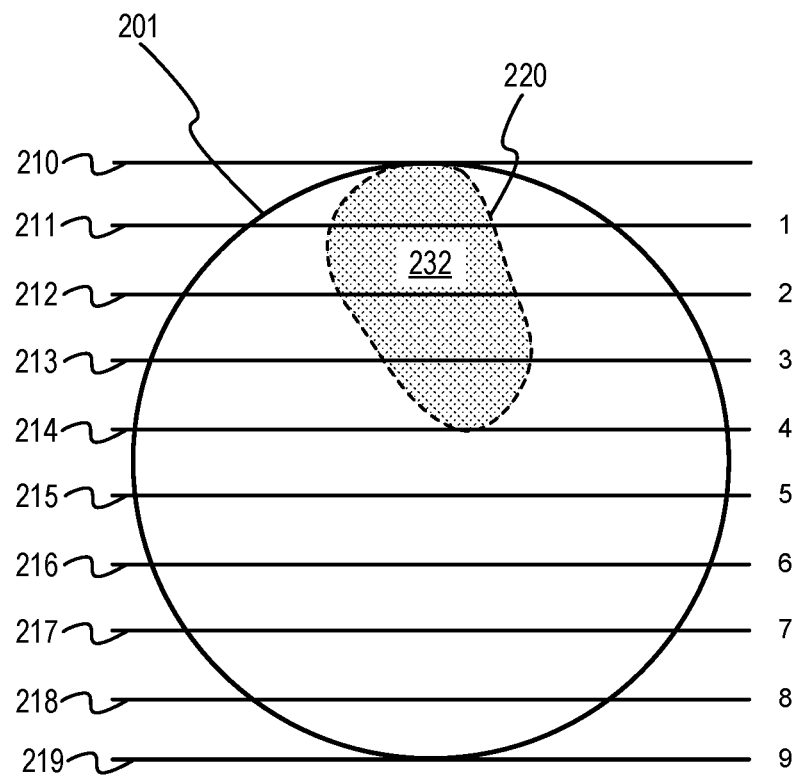
FIG. 2 is a frontal view of a cutter.

FIG. 2 is a frontal view of a cutter. The cutter 201 has a damaged region 232, and the cutter 201 can be similar to or identical to one or more of the cutters 111-116 of FIG. 1. Referring now to FIG. 2, each of a set of vertically descending horizontal lines 210-219 are overlaid on a frontal view of the cutter 201, wherein the horizontal lines are substantially equally spaced. The first horizontal line 210 and the tenth horizontal line 219 are at the top and bottom of the cutter 201, respectively. At the left of each of the horizontal lines 211-219 is a number representing a degradation severity value in the range of 1-9 from top to bottom in an ascending order (i.e. "1" is the top, "9" is the bottom), wherein the degradation severity value can be proportional with a cutter degradations severity.

The cutter 201 can be assigned a degradation severity value based on the extent of a damaged region 232 of the cutter, wherein the damaged region 232 of the cutter has a boundary 220, that extends downward from the first horizontal line 210. The degradation severity value corresponding to the bottom-most horizontal line in contact with the boundary 220 can be designated as the degradation severity value of the cutter. For example, the damaged region 232 has a boundary 220 that is in contact with the fifth horizontal line 214, which has a corresponding degradation severity value of 4. In response, a device or system can assign the cutter 201 a degradation severity value of 4.

Figure 3:
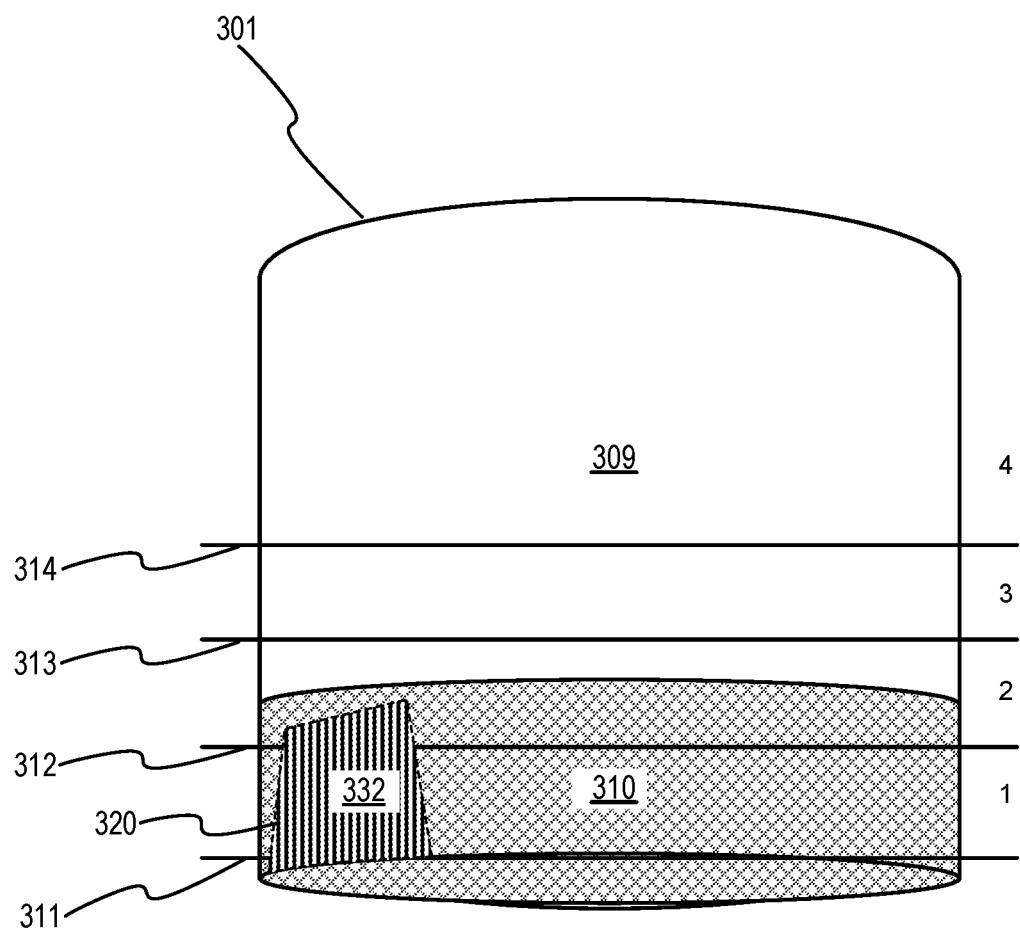
FIG. 3 is a side view of a cutter.

Referring now to FIG. 3, a cutter 301 has a damaged region 332, and the cutter 301 can be similar to or identical to one or more of the cutters 111-116 of FIG. 1. Each of a set of vertically ascending horizontal lines 311-314 are overlaid on a sideview of the cutter 301, wherein the horizontal lines are substantially equally spaced. The cutter 301 comprises a carbide volume 309 and a PDC volume 310 mounted on the carbide volume 309, wherein the PDC volume 310 is the cutting portion of the cutter 301 during a drilling operation. The first horizontal line 311 is shown at the PDC edge of the PDC volume 310 of the cutter 301. The fourth horizontal line 314 is shown at the middle of the cutter 301, between the edge of the PDC volume 310 and the other axial end of the cutter 301. In between each of the horizontal lines 311-314 is a number representing a lateral degradation severity value in the range of 1-4 from top to bottom in an ascending order (i.e. "1" is the lateral degradation severity value of damage limited to the face of the PDC volume 310, "4" is the lateral degradation severity value of damage that penetrates deep into 301), wherein the lateral degradation severity value can be proportional with a cutter degradations severity along the side of the cutter.

The cutter 301 can be assigned a lateral degradation severity value based on the extent of a damaged region 332 of the cutter, wherein the damaged region 332 of the cutter has a boundary 320, that extends into the cutter's axial center from the first horizontal line 311. The lateral degradation severity value of the cutter can be assigned based on the distance that the damaged region 332 axially extends into the cutter 301. For example, the damaged region 332 extends until the boundary 320 is between the horizontal line 312 and 313, which has a corresponding lateral degradation severity value of "2." In response, a device or system can assign the cutter 301 a lateral degradation severity value of "2."

Example Flowchart

The flowchart described below is provided to aid in understanding the illustrations and is not to be used to limit scope of the claims. The flowchart depicts example operations that can vary within the scope of the claims. Additional operations may be performed; fewer operations may be performed; the operations shown may be performed in parallel; and the operations shown may be performed in a different order. For example, the operations depicted in blocks 404, 408, 412, 430, 434, and 438 of FIG. 4 can be performed in parallel or serially for multiple cutters on a drill bit. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus, for execution.

Figure 4:
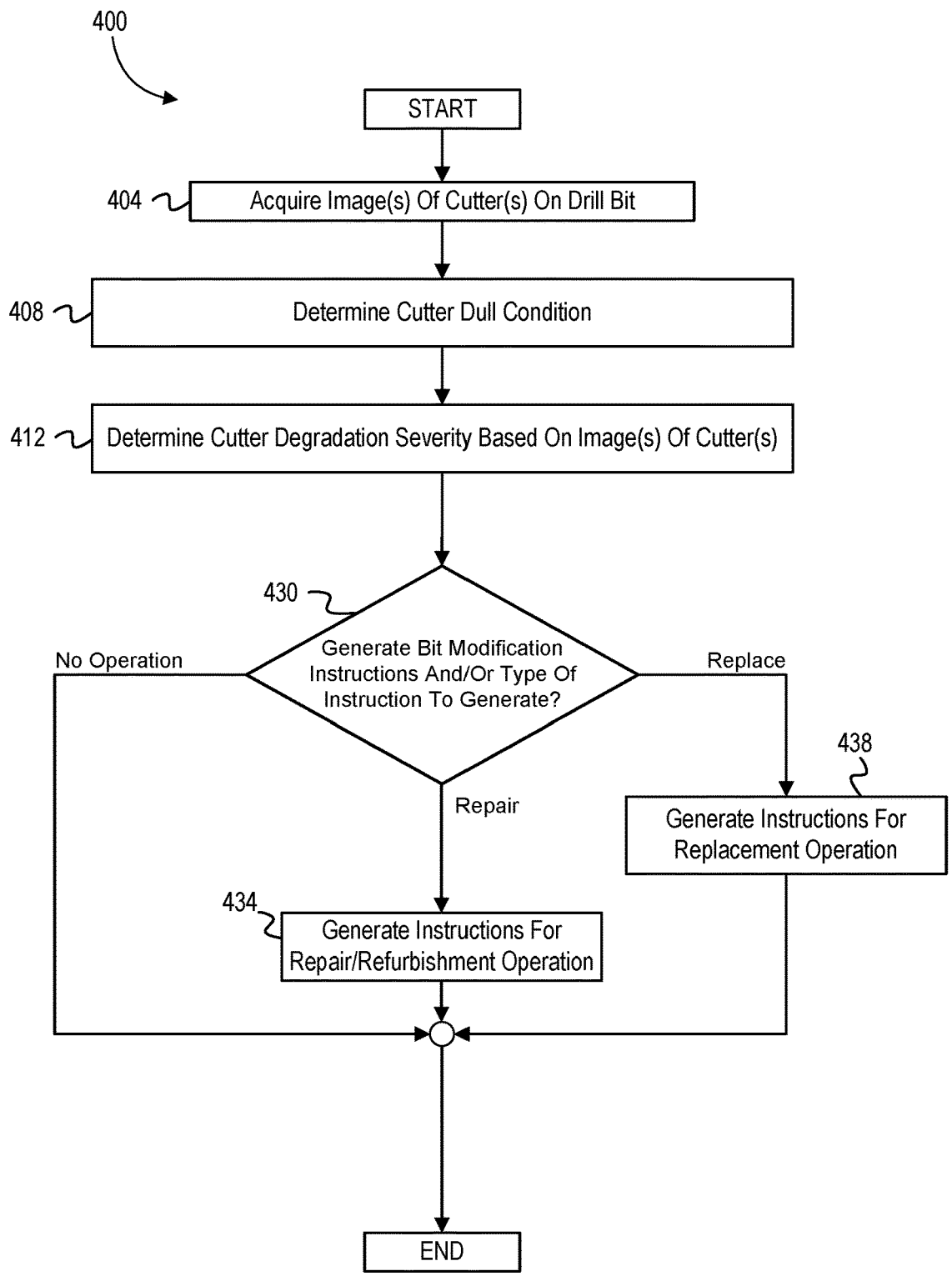
FIG. 4 is a flowchart of operations to evaluate and generate bit modification instructions for a cutter on a drill bit.

FIG. 4 is a flowchart of operations to evaluate and generate bit modification instructions for a cutter on a drill bit. FIG. 4 depicts a flowchart 400 of operations to evaluate and generate bit modification instructions using a system that includes a processor. For example, operations of the flowchart 400 can be performed using a system similar to or identical to the computer system 698 or computer device 700 shown in FIGS. 6-7, respectively. Operations of the flowchart 400 start at block 404.

At block 404, one or more images of one or more cutters on a drill bit are acquired. The system can acquire the drill bit images using a camera system or using images retrieved from a database corresponding to the drill bit for which the analysis is conducted. In some embodiments, one or more cameras of a camera system can be positioned facing a normal direction of a cutter surface. For example, with reference to FIG. 2 described above, a camera system can face a normal direction of a surface of the cutter 201 and view the surface of the cutter 201 as a circle. In other embodiments, the camera system can include light scanning systems and/or laser scanning systems.

At block 408, a device or system can operate to determine a cutter dull condition. In some embodiments, the system can determine the cutter dull condition based on brightness values of the one or more images using a machine-learning framework. In some embodiments, the device or system can use a machine-learning framework that uses the pixel brightness values and analysis results based on the brightness values as input to determine cutter dull conditions. For example, a system can measure pixel brightness values, brightness mean values within small regions, and brightness variance within a region as part of a features list. The machine-learning framework can then be trained on training data, wherein the training data can include a set of training images and a set of known cutter dull conditions. The training images can depict a set of cutters, wherein each of the known cutter dull conditions are associated with one or more of the set of cutters, and wherein a loss function of the training can be based on the known cutter dull conditions. For example, the training images can include an image of a cutter wherein the brightness variance is within a particular range and is associated with a cutter dull condition of "worn" using a machine-learning framework. The machine-learning framework can have been trained using training data that includes the cutter dull condition "worn" and has the cutter dull condition "worn" associated with a set of cutters depicted in a set of training images.

In some embodiments, the device or system can assign the regions having a brightness variance greater than the variance threshold as a worn cutter region corresponding with the state "worn." For example, a device or system can train a neural network using a training set comprising 9001 drill bit images including a total of 900,100 cutter images, wherein the cutter images can correspond with known cutter dull conditions such as an undamaged cutter, a worn cutter, a broken cutter, etc. The trained neural network of the machine-learning framework can then generate predictions of a cutter dull condition such as "undamaged," "worn," "broken," etc.

At block 412, the device or system can determine a cutter degradation severity based on one or more images acquired at block 404. In some embodiments, the device or system can determine a cutter degradation severity using a machine-learning method similar to the machine-learning method described for block 408. For example, the device or system can use a neural network in the machine-learning framework that has been trained on training data, wherein the training data includes a set of training images and a set of known cutter degradation severity values. The training images can depict a set of cutters, wherein each of the set of known cutter degradation severity values are associated with one or more of the set of cutters, wherein a loss function of the training can be based on the known cutter degradation severity values. In some embodiments, the known cutter degradation severity values can be labeled from subject matter experts. In some embodiments, to allow for robustness in the bit modification instructions described below, there can be at least three distinct values in the set of known cutter degradation severity values.

In addition, or alternatively, pre-processing of the training images can apply pixel brightness and pixel pattern recognition to determine a boundary and/or area of the undamaged regions in the set of cutters depicted by the training images. The machine-learning framework can then use the boundary and/or area as training data inputs when training the machine-learning. For example, the training images can include an image of a cutter wherein a detected pixel brightness of an undamaged region is within an undamaged brightness range and a pixel pattern is recognized as a corresponding with the undamaged region. The corresponding region size and/or boundary of the undamaged region is associated with a cutter degradation severity value of "2" using the machine-learning framework, wherein the machine-learning framework can have been trained using training data that includes the cutter dull condition "worn" and has the cutter severity value "2" associated with a set of cutters depicted in a set of training images.

Alternatively, the system can operate to compare pixel brightness values and/or pixel patterns to determine an area of the cutter surface that is degraded using other methods. For example, the system can determine an area of the cutter surface that is uniform and undamaged based on a low-variation pixel pattern and determine a brightness threshold based on this area. The system can then compare the pixel brightness values to this brightness threshold and determine that pixels having brightness values exceeding this brightness threshold represent damaged portions of a cutter. The system can then generate a boundary of the damaged portion(s) using an edge detection method and determine a cutter degradation severity based on the area of the damaged portion(s) and/or the boundary of the damaged portion. For example, with reference to FIG. 2 above, if a cutter damaged portion begins from the first horizontal line 210 and goes as low as the fifth horizontal line 214, this condition would correspond with a cutter degradation severity of "4".

Alternatively, or in addition, the device or system can also determine a lateral degradation severity value. For example, with reference to FIG. 3 above, if a cutter damaged portion begins from the first horizontal line 311 and shows damage that extends to the third horizontal line 313, this condition would correspond with a cutter degradation severity of "3". Furthermore, or alternatively, the device or system can determine a carbide condition of a cutter carbide portion based on images. For example, with reference to FIG. 3, the system can determine the condition of the carbide volume 309. In some embodiments, based on the carbide condition, the system or device can increase or decrease a cutter degradation severity value. Alternatively, the device or system can generate a cutter carbide degradation severity value.

At block 430, the device or system can make a determination as to whether to generate bit modification instructions and/or the type of instructions to generate. Bit modification instructions can include instructions for a repair operation for the cutter and/or instructions to initiate a replacement operation for the cutter. In some embodiments, bit modification instructions can include instructions that no operation based on the cutter degradation severity and cutter dull condition is needed. In some embodiments, the system can use a classification scheme to determine whether to generate instructions and/or what instructions to generate based on the cutter dull condition and a comparison of a degradation severity value to a degradation severity threshold and/or a comparison of a lateral degradation severity value to a lateral degradation severity threshold.

In some embodiments, the classification scheme can be implemented using a machine-learning framework. The machine-learning framework can be the same machine-learning framework described above for block 408 and block 412. For example, the device or system can use a neural network in the machine-learning framework that has been trained on training data to generate bit modification instructions. The training data includes a set of training images depicting a set of cutters, a set of known cutter degradation severity values associated with the set of cutters, a set of known cutter dull conditions associated with the set of cutters, and a set of known bit modification instructions, wherein a loss function of the training can be based on the known bit modification instructions. For example, the machine-learning framework can receive as input an image of a cutter associated with a cutter dull condition of "broken" and a cutter degradation severity value of "4" and provide as an output the bit modification instructions of "replace cutter." The machine-learning framework can have been trained using training data that includes the known cutter dull condition "worn", the known degradation severity value "2," and the known bit modification instruction "replace cutter" associated with a set of cutters depicted in a set of training images.

In some embodiments, the classification scheme can include a set of drill bit cutter performance criteria. For example, the set of drill bit cutter performance criteria can include a first rule that cutters having at least one of a first set of cutter dull conditions and/or a degradation severity value that exceeds a first threshold value correspond with a repair condition, a second rule that cutters having at least one of a second set of cutter dull conditions and/or a degradation severity value that exceeds a second threshold value correspond with a replacement operation. For example, the classification scheme can have a rule that the device or system generates instructions to replace the cutter if the cutter degradation severity is greater than 2 or if the cutter dull condition includes "broken." With respect to Table 1 below, for each of the cutters listed in Table 1 below, the "Cutter Dull Condition" can be determined using operations described for block 408, the degradation severity value can be determined using operations described for block 412, and the instruction type to generate can be determined using the classification scheme.

TABLE 1

| Cutter | Cutter Dull Condition | Degradation Severity Value | Instruction Type |
| --- | --- | --- | --- |
| 1 | Undamaged | 0 | No Operation |
| 2 | Broken | 2 | Replace |
| 3 | Worn | 1 | Repair |
| 4 | Worn | 5 | Replace |

If the device or system determines that bit modification instructions corresponding with a repair operation are to be generated, the system can proceed to block 434. If the system determines that that bit modification instructions corresponding with a replacement operation are to be generated, the system can proceed to block 438. Otherwise, the system can determine that bit modification instructions can correspond with instructions to perform no action and either generate no instructions at all or generate an explicit instruction that no action is to be performed based on the cutter dull condition and cutter degradation severity, and then proceed consider operations of the flowchart 400 to be complete.

At block 434, the system generates instructions for a repair operation and/or refurbishment operation. Generating instructions for the repair and/or refurbishment operation can include determining a specific operation based on the cutter dull condition and/or cutter degradation severity satisfying one or more drill bit cutter performance criteria, wherein the drill bit cutter performance criteria can be based on generating instructions to rotate one or more cutters on the drill bit. In some embodiments, instructions to rotate the one or more cutters can include computer code or a message interpretable by a software application, wherein the instructions to rotate the one or more cutters activate a machine to physically rotate the one or more cutters. Alternatively, generating instructions to rotate the one or more cutters can include generating a visual indicator on an electronic display system to rotate the one or more cutters. Alternatively, or in addition, repair operations can also include instructions to re-braze one or more cutters. In some embodiments, instructions to re-braze the one or more cutters can include computer code or a message interpretable by a software application, wherein the instructions to re-braze the one or more cutters activate a machine to physically re-braze the one or more cutters. In some embodiments, generating instructions to re-braze the one or more cutters can include generating a visual indicator on the electronic display system to re-braze the one or more cutters. In some embodiments, operations of the flowchart 400 can return to block 404 as part of an analysis cycle. Alternatively, once the system generates instructions for a replacement operation, operations of the flowchart 400 can be considered complete.

At block 438, the system generates instructions for a replacement operation. Generating instructions for the replacement operation can include generating instructions to replace one or more cutters on the drill bit. In some embodiments, instructions to replace the one or more cutters can include computer code or a message interpretable by a software application, wherein the instructions to replace the one or more cutters activate a machine to physically remove the one or more cutters from the drill bit and/or mount new cutters on the drill bit. Alternatively, generating instructions to replace the one or more cutters can include generating a visual indicator on an electronic display system to replace the one or more cutters. In some embodiments, the instructions to replace the one or more cutters can include instructions to change the one or more cutters with cutters of a different type. For example, the instructions can include instructions to replace the one or more cutters that are of a first type with one or more cutters that are of a second type, wherein the second type is different from the first type. Alternatively, the instructions can include instructions to replace the one or more cutters that are of a first type with one or more cutters that are still of the first type. In some embodiments, the decision to change cutter types or keep the same cutter type during replacement can be determined based on a known used lifetime of the cutter and whether the cutter degradation severity exceeds a replacement severity threshold, wherein exceeding the replacement severity threshold can result in instructions to change the cutter type during replacement. In addition, or alternatively, the instructions to change cutter types can default to a recommended cutter type, wherein the recommended cutter type can be the same or be different from the cutter being replaced. In some embodiments, operations of the flowchart 400 can return to block 404 as part of an analysis cycle. Alternatively, once the system generates instructions for a replacement operation, operations of the flowchart 400 can be considered complete.

Figure 5:
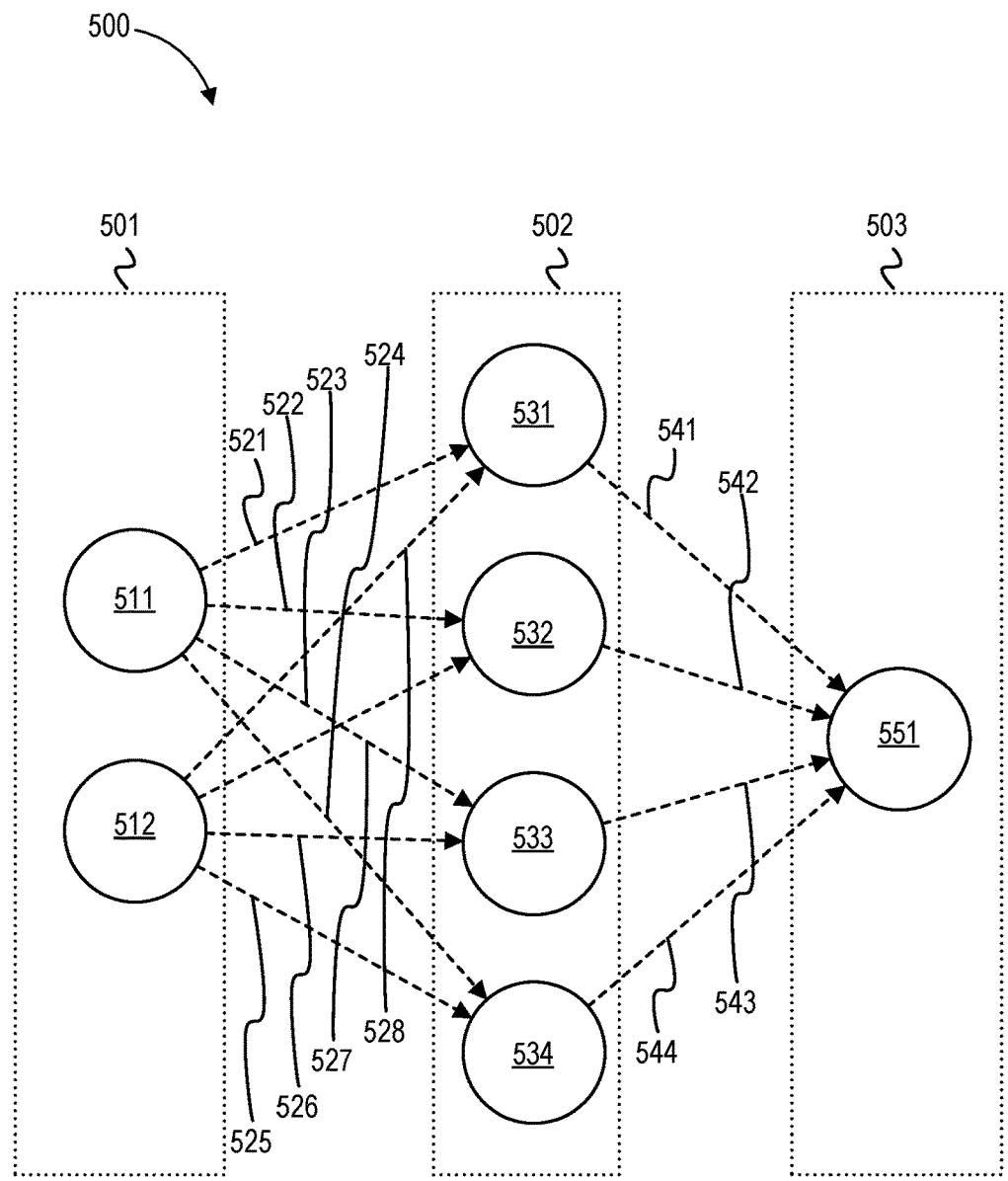
FIG. 5 is an example neural network used to generate the bit dull condition for a cutter on a drill bit.

FIG. 5 is an example neural network used to generate the bit dull condition for a cutter on a drill bit. With reference to FIG. 4 above, the machine-learning method described for block 408 and/or block 412 can use the neural network 500. The neural network 500 includes an input layer 501, a hidden layer 502, and an output layer 503. The input layer includes a first input node 511 and second input node 512. The first input node 511 and second input node 512 can represent values such as cutter image pixel brightness, pixel brightness variance, average difference from pixel brightness values of nearest neighbors, etc. While the input layer depicts two input nodes, various other numbers of inputs such as 10 input nodes, 9999 input nodes, etc. can be used.

The hidden layer 502 includes the hidden nodes 531-534, wherein each of the input nodes 511-512 can be connected to the hidden nodes 531-534 with forward connections represented by lines 521-528. The lines 521-524 represent forward connections from the first input node 511 to each of the hidden nodes 531-534. The lines 525-528 represent forward connections from the second input node 512 to each of the hidden nodes 531-534. Each of the connections represented by the lines 521-528 can have an associated weight value that the device or system can apply when sending a node output as an input to another node. For example, the connection represented by the line 521 can have a weight of 0.25, the connection represented by the line 522 can have a weight of 0.5, the connection represented by the line 523 can have a weight of 0.45, and the connection represented by the line 524 can have a weight 0.99. Each of the nodes of the hidden layer can apply an activation function, such as the sigmoidal function shown in Equation 1, to its corresponding input values and sum them. In this case, x represents an output value from a previous node to a receiving node, w represents a corresponding weight value, and f (x) is an output value:

$$f(x) = \frac{1}{1 + e^{-w*x}} \quad (1)$$

In some embodiments, the hidden node 531-534 can use other functions such as a hyperbolic function, step function, etc. While the hidden layer 502 depicts a single node layer, the hidden layer 502 can include multiple layers of nodes. Furthermore, while the hidden layer 502 is depicted as having four nodes, the hidden layer 502 can include any number of nodes, such as 1000 nodes, 9000 nodes, 1 million nodes, etc.

The output layer 503 includes the output nodes 551, wherein the hidden nodes 531-534 can be connected to the output nodes 551 with forward connections represented by lines 541-544. The lines 541-544 represent forward connections from each of the hidden nodes 531-534 to the output node 551. Each of the connections represented by the lines 541-544 can have an associated weight value that the device or system can multiply when sending a node output as an input to another node. For example, the connection represented by the line 541 can have a weight of 0.35, the connection represented by the line 542 can have a weight of 0.15, the connection represented by the line 543 can have a weight of 0.43, and the connection represented by the line 544 can have a weight 0.91. The output node can apply an activation function to its corresponding input values and sum them using the same Equation 1. Alternatively, the activation function of the output node can be one of various other functions such as a hyperbolic function, step function, etc. The output value can then be converted to one or more identified bit dull conditions based on a data table. For example, the output value 0.25 can be converted to the bit dull condition of "worn."

Example Onshore Drilling Platform

Figure 6:
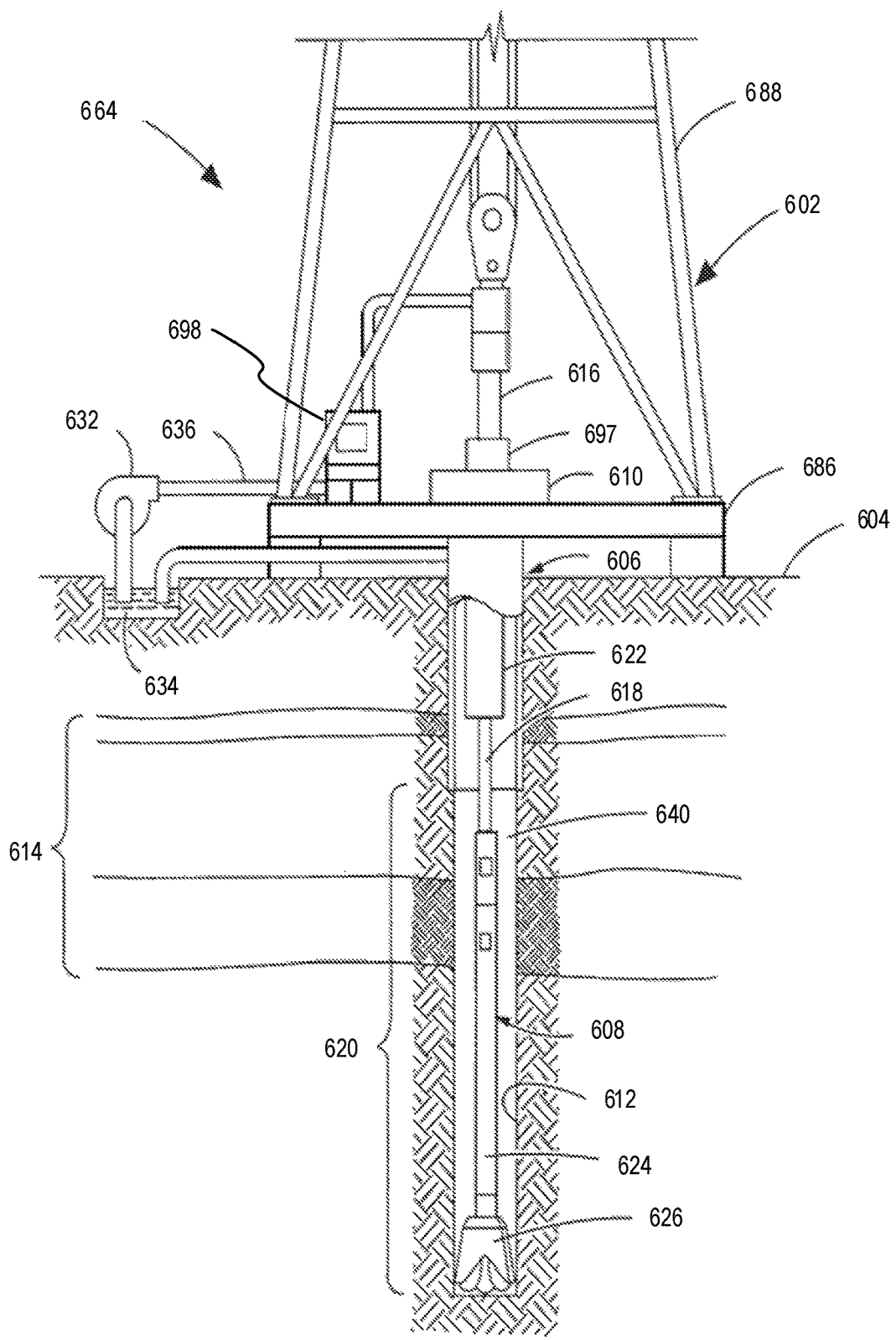
FIG. 6 is an elevation view of an onshore platform that includes a drill bit in a borehole.

FIG. 6 is an elevation view of an onshore platform that includes a drill bit in a borehole. FIG. 6 shows a system 664 that includes a portion of a drilling rig 602 located at the surface 604 of a well 606. Drilling of oil and gas wells is commonly carried out using a string of drill pipes connected together so as to form a drilling string 608 that is lowered through a rotary table 610 into a borehole 612. Here a drilling platform 686 is equipped with a derrick 688 that supports a hoist.

The drilling rig 602 may thus provide support for the drill string 608. The drill string 608 may operate to rotate the rotary table 610 for drilling the borehole 612 through subsurface formations 614. The drill string 608 may include a Kelly 616, drill pipe 618, and a bottom hole assembly 620, perhaps located at the lower portion of the drill pipe 618.

The bottom hole assembly 620 may include drill collars 622, a down hole tool 624, and a drill bit 626 that includes a set of cutters. The drill bit 626 may operate to create a borehole 612 by penetrating the surface 604 and subsurface formations 614. The down hole tool 624 may comprise any of a number of different types of tools including measurement while drilling (MWD) tools, logging while drilling (LWD) tools, and others. With respect to FIG. 4, the drill bit 626 can include cutters that have been analyzed, rotated, and/or replaced using operations described for the flowchart 400.

During drilling operations, the drill string 608 (perhaps including the Kelly 616, the drill pipe 618, and the bottom hole assembly 620) may be rotated by the rotary table 610. In addition to, or alternatively, the bottom hole assembly 620 may also be rotated by a motor such as a mud motor that is located down hole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614. With reference to FIG. 4 above, the computer system 698 can perform some or all of the operations described above in the flowchart 400 of operations to evaluate and generate bit modification instructions for a cutter on a drill bit.

During drilling operations, a mud pump 632 may pump drilling fluid (sometimes known by those of ordinary skill in the art as "drilling mud") from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 612. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation 614 cuttings created by operating the drill bit 626.

Example Computer

Figure 7:
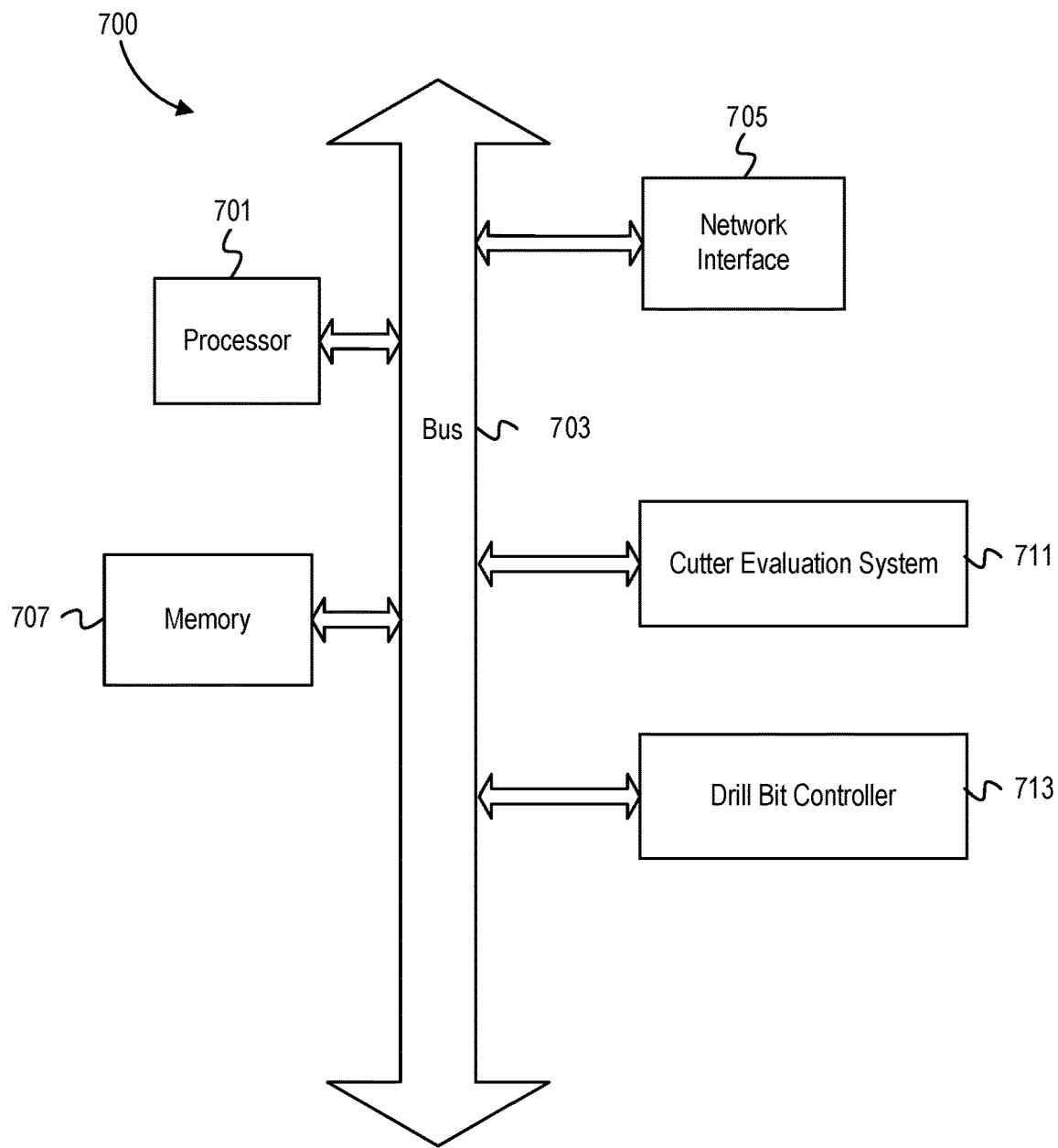
FIG. 7 is a schematic diagram of an example computer device.

FIG. 7 is a schematic diagram of an example computer device. A computer device 700 includes a processor 701 (possibly including multiple processors, multiple cores, multiple nodes, and/or implementing multi-threading, etc.). The computer device 700 includes a memory 707. The memory 707 may comprise system memory. Example system memory can include one or more of cache, static random access memory (RAM), dynamic RAM, zero capacitor RAM, Twin Transistor RAM, enhanced dynamic RAM, extended data output RAM, double data rate RAM, electrically erasable programmable read-only memory, nano RAM, resistive RAM, "silicon-oxide-nitride-oxide-silicon memory, parameter RAM, etc., and/or any one or more of the above already described possible realizations of machine-readable media. The computer device 700 also includes a bus 703. The bus 703 can include buses such as Peripheral Component Interconnect (PCI), Industry Standard Architecture (ISA), PCI-Express, HyperTransport® bus, InfiniBand® bus, NuBus, etc. The computer device 700 can also include a network interface 705 (e.g., a Fiber Channel interface, an Ethernet interface, an internet small computer system interface, synchronous optical networking interface, wireless interface, etc.).

The computer device 700 can include a cutter evaluation system 711. The cutter evaluation system 711 can perform one or more operations to generate modification instructions as described above. For example, the cutter evaluation system 711 can determine a cutter dull condition and/or a cutter degradation severity based on an acquired cutter image. Additionally, the cutter evaluation system 711 can generate bit modification instructions based on the cutter dull condition and cutter degradation severity.

The computer device 700 can include a drill bit controller 713. The drill bit controller 713 can perform one or more operations to control a drill bit as described above. For example, the drill bit controller 713 can lower a drill bit during a drilling operation. Additionally, the drill bit controller 713 can activate a drill bit during the drilling operation. In addition, although illustrated together, the computer device 700 can include the drill bit controller 713 without the cutter evaluation system 711 or include the cutter evaluation system 711 without the drill bit controller 713.

Any one of the previously described functionalities can be partially (or entirely) implemented in hardware and/or on the processor 701. For example, the functionality can be implemented with an application specific integrated circuit, in logic implemented in the processor 701, in a co-processor on a peripheral device or card, etc. Further, realizations can include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 can be coupled to the processor 701.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine-readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine-readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Terminology and Variations

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. For example, a set of numbers can be used to describe a single number or multiple numbers. As used herein, training a machine-learning framework means to train one or more neural networks of the machine-learning framework, wherein training alters one or more coefficients of the neurons/nodes in the one or more neural networks.

EXAMPLE EMBODIMENTS

Example embodiments include the following:

Embodiment 1: A method comprising acquiring an image of a cutter on a drill bit, determining a cutter dull condition based on the image of the cutter, determining a cutter degradation severity based the image of the cutter, and generating bit modification instructions based the cutter dull condition and the cutter degradation severity.

Embodiment 2: The method of Embodiment 1, wherein determining the cutter degradation severity comprises determining a boundary of a damaged region on the cutter.

Embodiment 3: The method of Embodiments 1 or 2, wherein the bit modification instructions comprise instructions to rotate the cutter on the drill bit.

Embodiment 4: The method of any of Embodiments 1-3, wherein the bit modification instructions comprise instructions to replace the cutter on the drill bit.

Embodiment 5: The method of any of Embodiments 1-4, wherein the cutter is a first cutter having a first cutter type, wherein the instructions to replace the first cutter on the drill bit comprise instructions to replace the first cutter on the drill bit with a second cutter having a second cutter type, wherein the second cutter type is different from the first cutter type.

Embodiment 6: The method of any of Embodiments 1-5, wherein determining the cutter dull condition comprises determining the cutter dull condition based on the image of the cutter using a machine-learning method.

Embodiment 7: The method of Embodiment 6, further comprising training the machine-learning method based on a training set of cutters, wherein the training set of cutters comprises known cutter dull conditions, and wherein at least a first of the known cutter dull conditions correspond with a broken condition.

Embodiment 8: One or more non-transitory machine-readable media comprising program code for generating bit modification instructions, the program code to acquire an image of a cutter on a drill bit, determine a cutter dull condition based on the image of the cutter, determine a cutter degradation severity based the image of the cutter, and generate the bit modification instructions based the cutter dull condition and the cutter degradation severity.

Embodiment 9: The machine-readable media of Embodiment 8, wherein the program code to determine the cutter degradation severity comprises program code to determine a boundary of a damaged region on the cutter.

Embodiment 10: The machine-readable media of Embodiments 8 or 9, wherein the bit modification instructions comprise instructions to rotate the cutter on the drill bit.

Embodiment 11: The machine-readable media of any of Embodiments 8-10, wherein the bit modification instructions comprise instructions to replace the cutter on the drill bit.

Embodiment 12: The machine-readable media of Embodiment 11, wherein the cutter is a first cutter having a first cutter type, wherein the instructions to replace the first cutter on the drill bit comprise instructions to replace the first cutter on the drill bit with a second cutter having a second cutter type, wherein the second cutter type is different from the first cutter type.

Embodiment 13: The machine-readable media of any of Embodiments 8-12, wherein the instructions to determine the cutter dull condition based on the image of the cutter comprise instructions to determine the cutter dull condition based on the image of the cutter using a machine-learning method.

Embodiment 14: An apparatus comprising a processor and a machine-readable medium having program code executable by the processor to cause the apparatus to acquire an image of a cutter on a drill bit, determine a cutter dull condition based on the image of the cutter, determine a cutter degradation severity based the image of the cutter, and generate bit modification instructions based the cutter dull condition and the cutter degradation severity.

Embodiment 15: The apparatus of Embodiment 14, wherein the program code to determine the cutter degradation severity comprises program code to determine a boundary of a damaged region on the cutter.

Embodiment 16: The apparatus of Embodiments 14 or 15, wherein the bit modification instructions comprise instructions to rotate the cutter on the drill bit, and wherein the instructions to rotate the cutter comprises a machine-readable message to activate a machine to rotate the cutter.

Embodiment 17: The apparatus of any of Embodiments 14-16, wherein the bit modification instructions comprise instructions to replace the cutter on the drill bit, and wherein the instructions to replace the cutter comprises a machine-readable message to activate a machine to remove the cutter.

Embodiment 18: The apparatus of Embodiment 17, wherein the cutter is a first cutter having a first cutter type, wherein the instructions to replace the first cutter on the drill bit comprise instructions to replace the first cutter on the drill bit with a second cutter having a second cutter type, wherein the second cutter type is different from the first cutter type.

Embodiment 19: The apparatus of any of Embodiments 14-18, wherein the program code to determine the cutter dull condition based on the image of the cutter comprise program code to determine the cutter dull condition based on the image of the cutter using a machine-learning method.

Embodiment 20: The apparatus of Embodiment 19, further comprising program code to train the machine-learning method based on a training set of cutters, wherein the training set of cutters comprises known cutter dull conditions.

What is claimed is:

1. A method comprising:
  acquiring one or more images of one or more cutters of a drill bit configured for drilling into a formation to produce a borehole; and
  for each cutter of the one or more cutters of the drill bit:
    determine a boundary of a damaged region of the cutter based on the one or more images of the cutter;
    overlay a set of lines over the one or more images of the cutter, wherein each line of the set of lines corresponds to a different degradation severity value; and
    assign a degradation severity value to the cutter based on a determination which one or ones of the set of lines contacts the boundary of the damaged region of the cutter;
  the method further comprising generating bit modification instructions based at least in part on a set of degradation severity values assigned to the one or more cutters of the drill bit.

2. The method of claim 1, wherein the bit modification instructions comprise instructions to rotate the cutter on the drill bit based on the cutter degradation severity value assigned to that cutter being greater than a cutter severity threshold value.

3. The method of claim 1, further comprising:
  determining a cutter dull condition based on the one or more images of the one or more cutters using a machine-learning method, wherein the machine-learning method is trained using a set of training images and a set of known cutter dull conditions, wherein each of the set of known cutter dull conditions is associated with one or more of a set of cutters depicted in the set of training images.

4. The method of claim 1, further comprising determining a lateral degradation severity value of the cutter, wherein the bit modification instructions are based at least in part on the lateral degradation severity value.

5. The method of claim 1, wherein the bit modification instructions comprise instructions to replace the cutter on the drill bit.

6. The method of claim 4, wherein the cutter is a first cutter having a first cutter type, wherein the instructions to replace the first cutter on the drill bit comprise instructions to replace the first cutter on the drill bit with a second cutter having a second cutter type, wherein the second cutter type is different from the first cutter type.

7. The method of claim 4, wherein the cutter is a first cutter having a first cutter type, wherein the instructions to replace the first cutter on the drill bit comprise instructions to replace the first cutter on the drill bit with a second cutter having the first cutter type.

8. A method comprising:
  acquiring a set of training data comprising training images, a set of known cutter dull conditions, and a set of known cutter degradation severity values,
  wherein the set of known cutter dull conditions comprises a first known condition and a second known condition, wherein the each of the set of known cutter dull conditions is associated with one or more of a set of cutters represented by the training images, and wherein at least one of the set of cutters is associated with the first known condition and not the second known condition, and
  wherein the set of known cutter degradation severity values includes a set of number value representing a degradation severity value assigned to a cutter based on an extent of a damaged region of the cutter; and
  generating a trained machine-learning framework from a machine-learning framework by training the machine-learning framework using the set of known cutter dull conditions, the set of known cutter degradation severity values, and the training images.

9. The method of claim 8, wherein the first known condition indicates a worn cutter and the second known condition indicates a broken cutter.

10. The method of claim 8, further comprising training the machine-learning framework using the set of known cutter dull conditions and a set of known bit modification instructions, wherein each of the set of known bit modification instructions is associated with one or more of the set of cutters, and wherein the machine-learning framework provides bit modification instructions based on a cutter dull condition.

11. The method of claim 8, further comprising training the machine-learning framework using the set of cutters and the set of known cutter degradation severity values, wherein each of the set of known cutter degradation severity values is associated with one or more of the set of cutters, and wherein the machine-learning framework predicts a cutter degradation severity based on an image of a cutter.

12. The method of claim 8, further comprising training the machine-learning framework using the set of known cutter dull conditions, the set of known cutter degradation severity values and a set of known bit modification instructions, wherein each of the set of known bit modification instructions is associated with one or more of the set of cutters, and wherein the machine-learning framework provides bit modification instructions based on a cutter dull condition and the cutter degradation severity.

13. An apparatus comprising:
a processor; and
a non-transitory machine-readable medium having program code executable by the processor to cause the apparatus to,
acquire one or more images of one or more cutters of a drill bit configured for drilling into a formation to produce a borehole; and
for each cutter of the one or more cutters of the drill bit:
determine a boundary of a damaged region of the cutter based on the one or more images of the cutter;
overlay a set of lines over the one or more images of the cutter, wherein each line of the set of lines corresponds to a different degradation severity value; and
assign a degradation severity value to the cutter based on a determination which one or ones of the set of lines contacts the boundary of the damaged region of the cutter;
the program code further executable by the processor to cause the apparatus to generate bit modification instructions based at least in part on a set of degradation severity values assigned to the one or more cutters of the drill bit.

14. The apparatus of claim 13, wherein the set of degradation severity values includes at least three distinct values.

15. The apparatus of claim 13, wherein the program code to determine the degradation severity values comprises program code to determine a surface area of the damaged region on each of the one or more cutters.

16. The apparatus of claim 13, wherein the bit modification instructions comprise instructions to rotate the cutter on the drill bit.

17. The apparatus of claim 13, wherein the bit modification instructions comprise instructions to replace the cutter on the drill bit.

18. The method of claim 3, wherein the set of known cutter dull conditions comprises an indicator for a broken cutter condition.

19. The apparatus of claim 13, wherein the program code further executable by the processor is further configured to cause the apparatus to determine a cutter dull condition based on the image of the cutter using a machine-learning method, wherein the machine-learning method is trained using a set of training images and a set of known cutter dull conditions, wherein each of the set of known cutter dull conditions is associated with one or more of a set of cutters depicted in the set of training images.

\* \* \* \* \*